United States Patent
Dos Santos et al.

(10) Patent No.: US 11,992,145 B2
(45) Date of Patent: May 28, 2024

(54) COOKING APPLIANCE FOR COOKING FOOD WITH OR WITHOUT PRESSURE

(71) Applicant: SEB S.A., Ecully (FR)

(72) Inventors: Quentin Dos Santos, Lyons (FR); Géraldine Doat, Caluire Et Cuire (FR)

(73) Assignee: SEB S.A. (FR)

( * ) Notice: Subject to any disclaimer, the term of this patent is extended or adjusted under 35 U.S.C. 154(b) by 290 days.

(21) Appl. No.: 16/913,000

(22) Filed: Jun. 26, 2020

(65) Prior Publication Data
US 2020/0405085 A1 Dec. 31, 2020

(30) Foreign Application Priority Data

Jun. 27, 2019 (FR) ..................................... 1907036

(51) Int. Cl.
| | |
|---|---|
| *A47J 27/08* | (2006.01) |
| *A47J 27/00* | (2006.01) |
| *A47J 27/04* | (2006.01) |
| *A47J 27/086* | (2006.01) |

(52) U.S. Cl.
CPC ......... *A47J 27/0804* (2013.01); *A47J 27/004* (2013.01); *A47J 27/04* (2013.01); *A47J 27/0802* (2013.01); *A47J 27/086* (2013.01); *A47J 2027/043* (2013.01)

(58) Field of Classification Search
None
See application file for complete search history.

(56) References Cited

U.S. PATENT DOCUMENTS

| 4,735,190 A | 4/1988 | Fischbach |
| 10,722,064 B2 | 7/2020 | Kim et al. |
| 10,736,457 B2 | 8/2020 | Kim et al. |
| 2005/0178274 A1 | 8/2005 | Cartigny et al. |

(Continued)

FOREIGN PATENT DOCUMENTS

| CN | 101238949 A | * | 8/2008 | ............ A47J 27/002 |
| CN | 207804046 U | | 9/2018 | |
| CN | 109431256 A | * | 3/2019 | ............ A47J 27/092 |

(Continued)

OTHER PUBLICATIONS

Machine translation of FR 2958517 A1 performed on Jun. 16, 2022, Chameroy et al. (Year: 2011).*

(Continued)

*Primary Examiner* — Dana Ross
*Assistant Examiner* — Kevin Guanhua Wen
(74) *Attorney, Agent, or Firm* — Lerner David LLP

(57) ABSTRACT

A cooking appliance includes a housing containing a cooking vessel configured to receive food to be cooked; a lid mounted pivotably on the housing between an open and a closed position; a steam outlet valve that is movable between a first valve position in which the steam outlet valve places the inside of the cooking vessel in communication with the outside of the cooking appliance, and a second valve position in which the steam outlet valve fluidly insulates the inside of the cooking vessel from the outside of the cooking appliance; a lid locking mechanism configured to lock the lid in the closed position; and a control member configured to be handled by a user and to control the locking and unlocking of the lid in relation to the housing.

17 Claims, 13 Drawing Sheets

(56) References Cited

U.S. PATENT DOCUMENTS

2012/0040067 A1  2/2012  Baraille et al.

FOREIGN PATENT DOCUMENTS

| CN | 109463999 A | * | 3/2019 | ............ | A47J 27/082 |
| CN | 208784402 U | | 4/2019 | | |
| EP | 148464 A1 | | 7/1985 | | |
| EP | 2100544 A1 | | 9/2009 | | |
| EP | 2208448 A1 | | 7/2010 | | |
| EP | 2557973 A2 | | 2/2013 | | |
| EP | 3020311 A1 | | 5/2016 | | |
| FR | 2958517 A1 | * | 10/2011 | ............. | A47J 27/09 |
| JP | 2008194135 A | | 8/2008 | | |
| JP | 3179182 U | * | 10/2012 | ............. | A47J 27/08 |
| KR | 20000007810 A | * | 2/2000 | .......... | A47J 27/0802 |
| KR | 101256993 B1 | * | 4/2013 | ......... | A47J 27/0804 |
| WO | WO 2018121199 A1 | * | 7/2018 | ............. | A47J 27/08 |

OTHER PUBLICATIONS

Machine translation of CN 109463999 A performed on Jun. 16, 2022, Huang et al. (Year: 2019).*
Machine translation of KR 20000007810 A performed on Jun. 16, 2022, Go et al. (Year: 2000).*
Machine translation of WO 2018121199 A1 performed on Jun. 16, 2022, He et al. (Year: 2018).*
Machine translation of CN 101238949 A performed on Jun. 16, 2022, Naito et al. (Year: 2008).*
Machine translation of CN 109431256 A performed on Oct. 4, 2022, Wen et al. (Year: 2019).*
Machine translation of KR 101256993 B1 performed on Oct. 4, 2022, Kim (Year: 2013).*
Machine translation of JP 3179182 U performed Aug. 4, 2023, Inoshita (Year: 2012).*
Search Report for French Application No. FR1907036 dated Jan. 17, 2020; 2 pages.

* cited by examiner

[Fig 1]
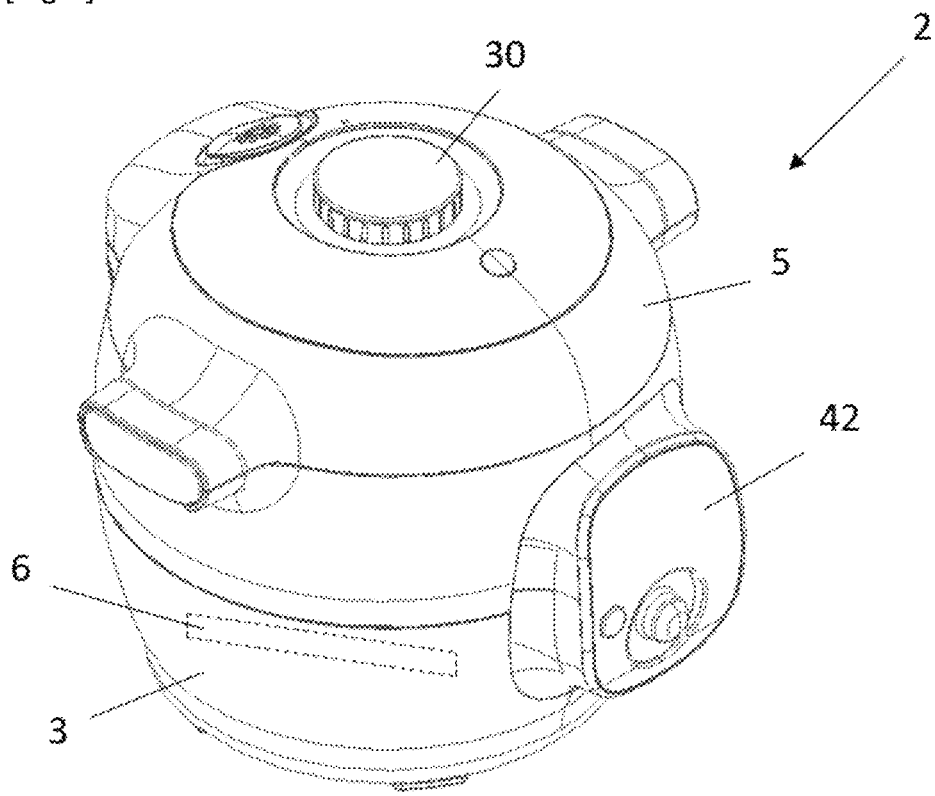
[Fig 2]
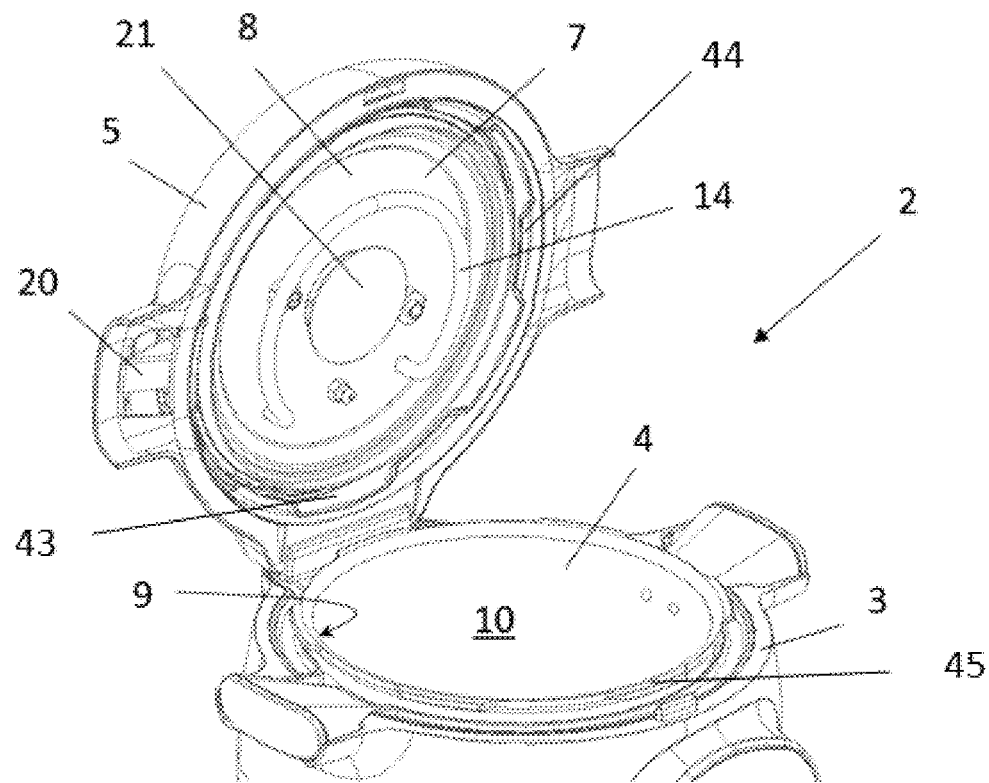

[Fig 3]
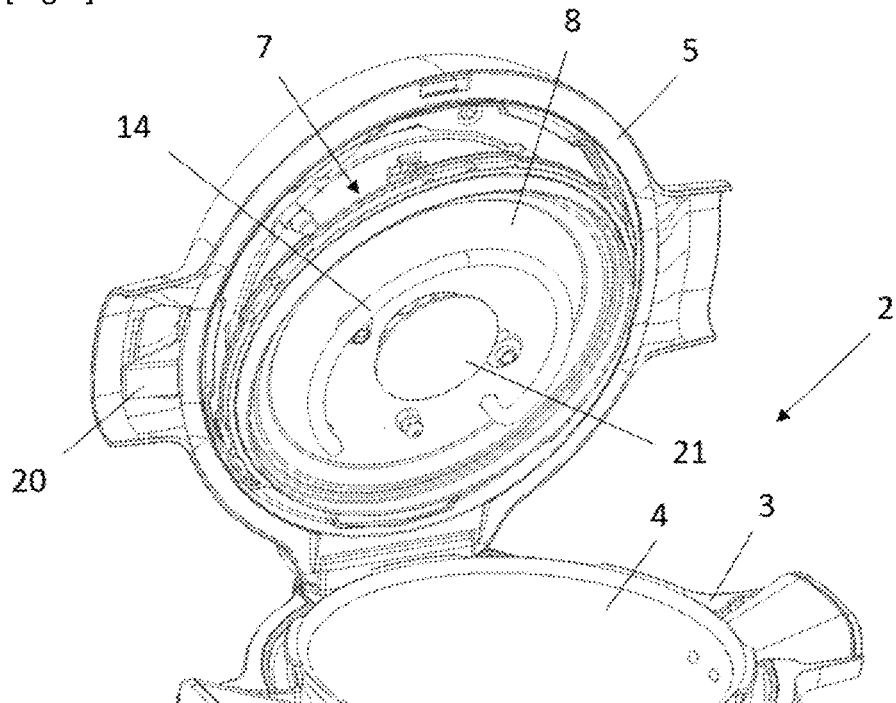
[Fig 4]
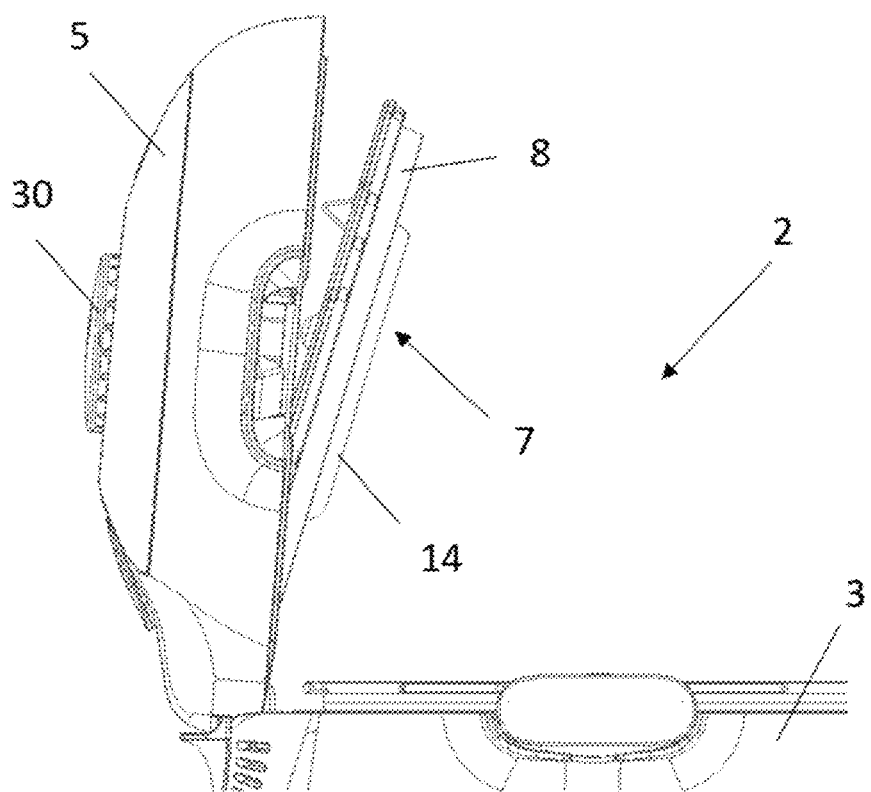

[Fig 5]
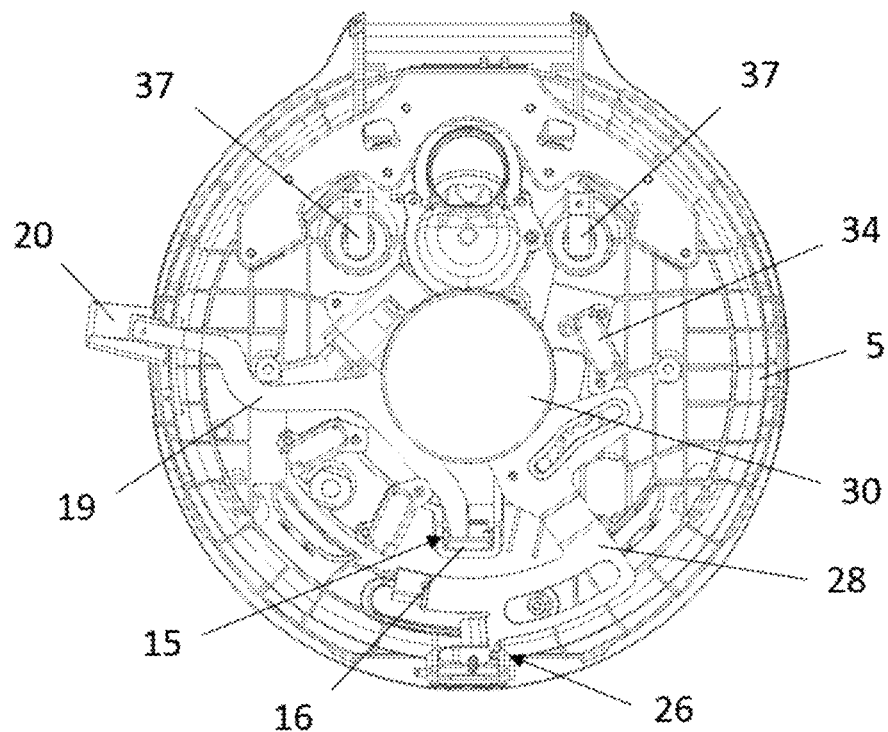
[Fig 6]
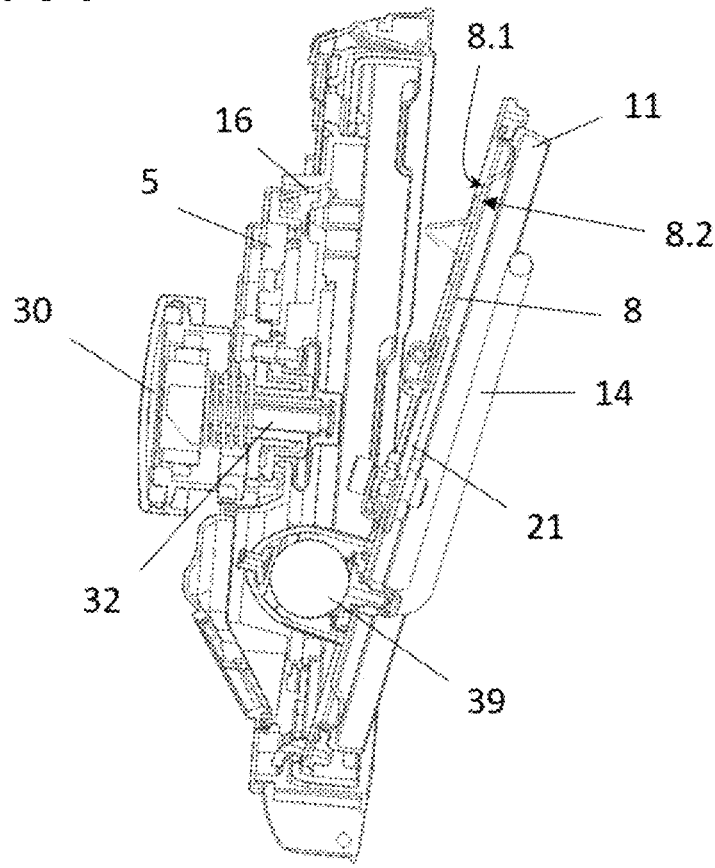

[Fig 7]
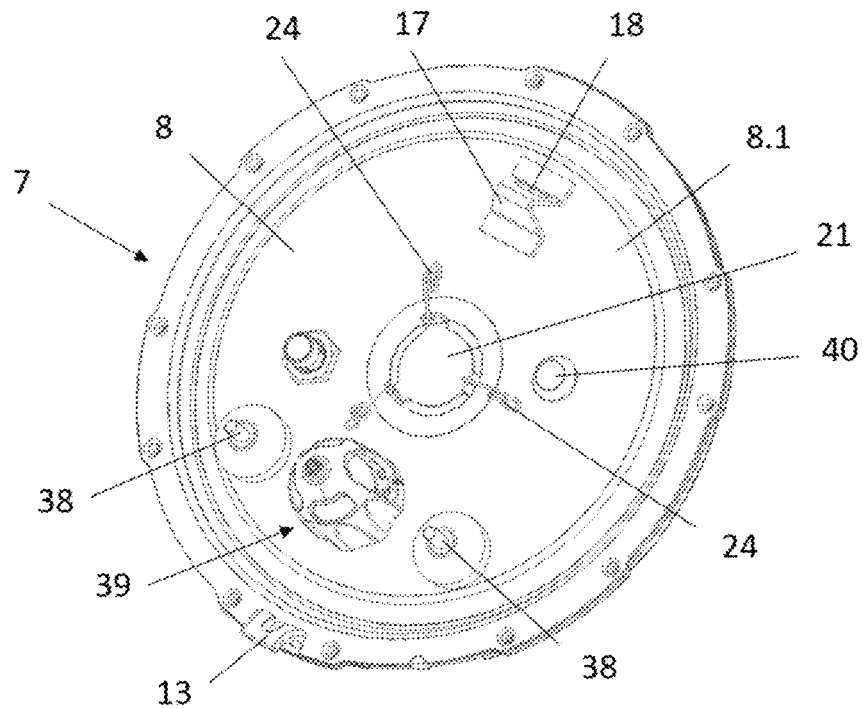
[Fig 8]
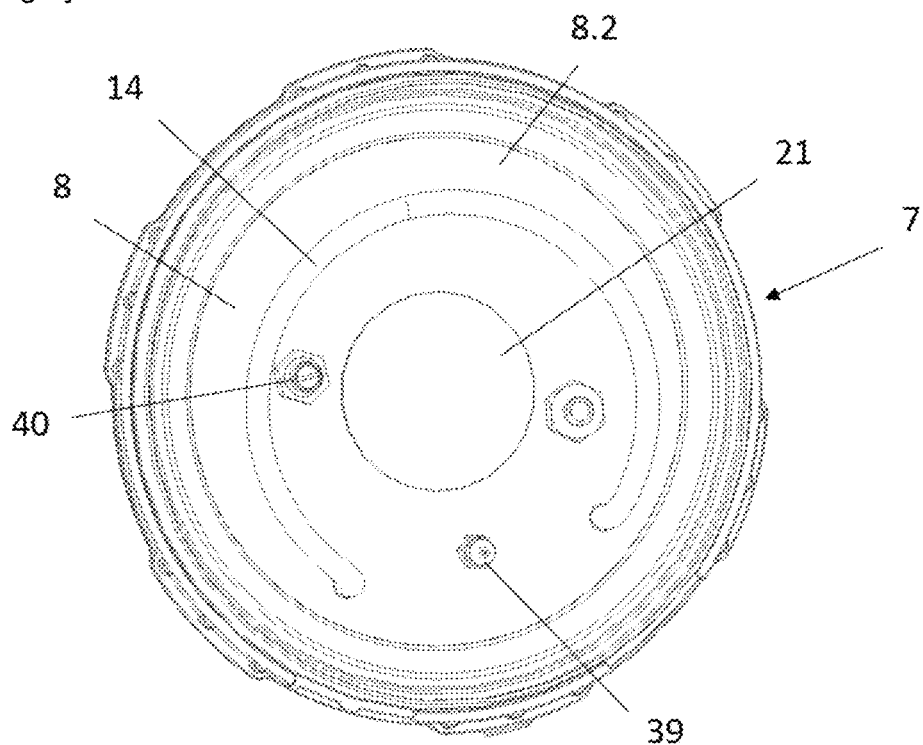

[Fig 9]
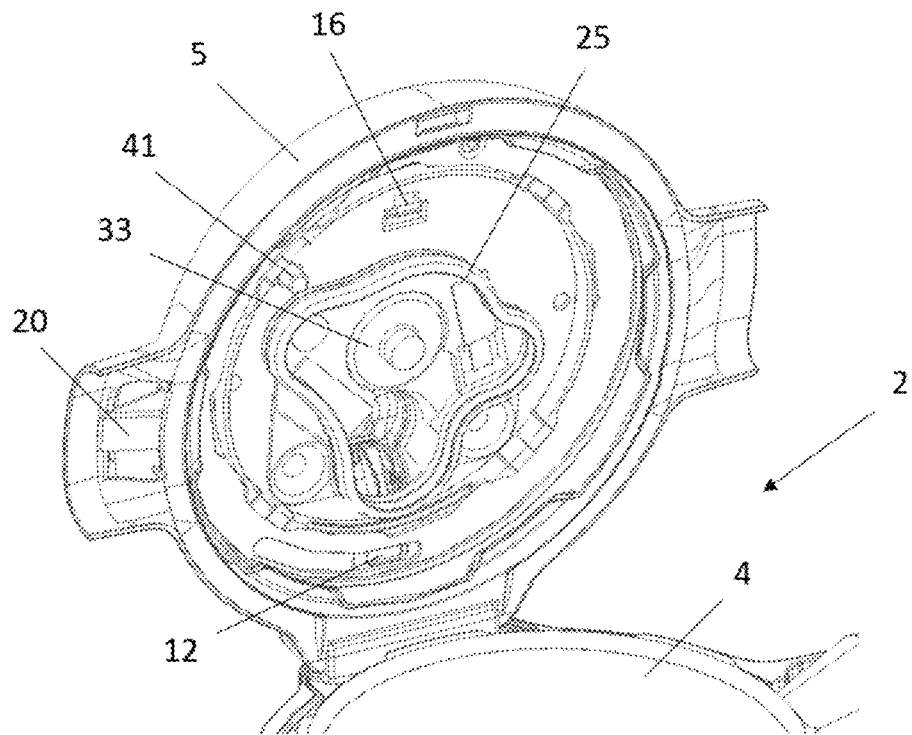
[Fig 10]
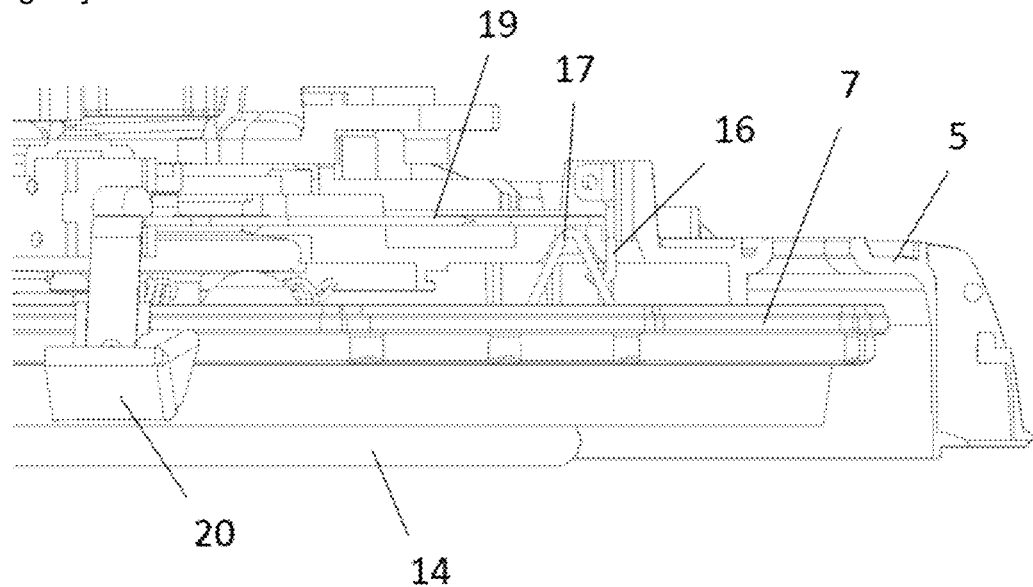

[Fig 11]
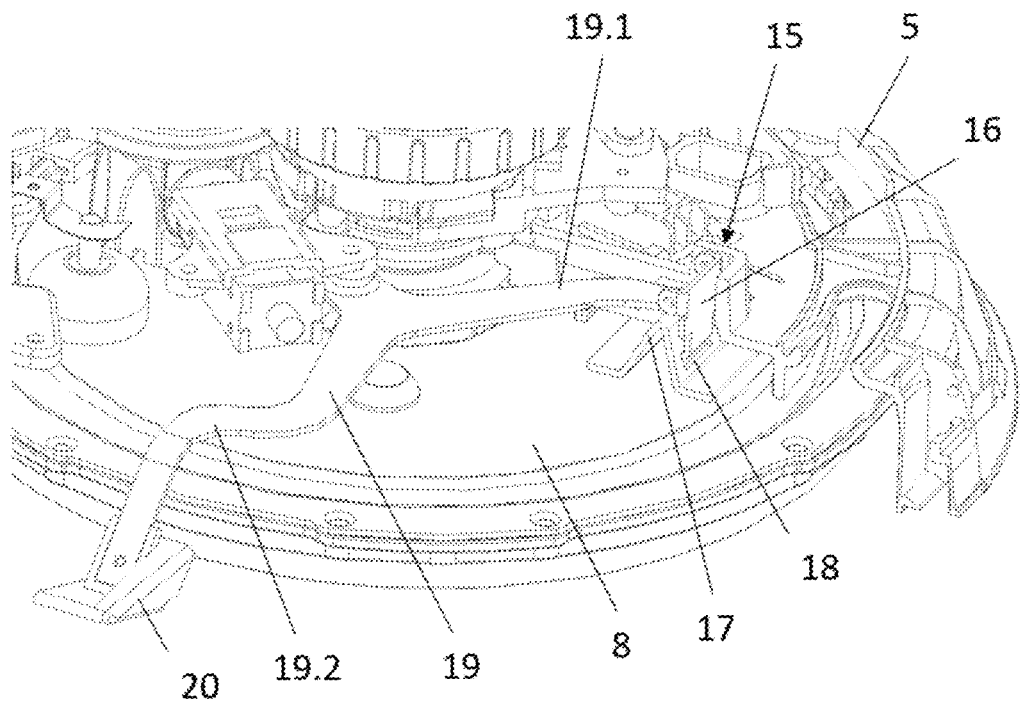
[Fig 12]
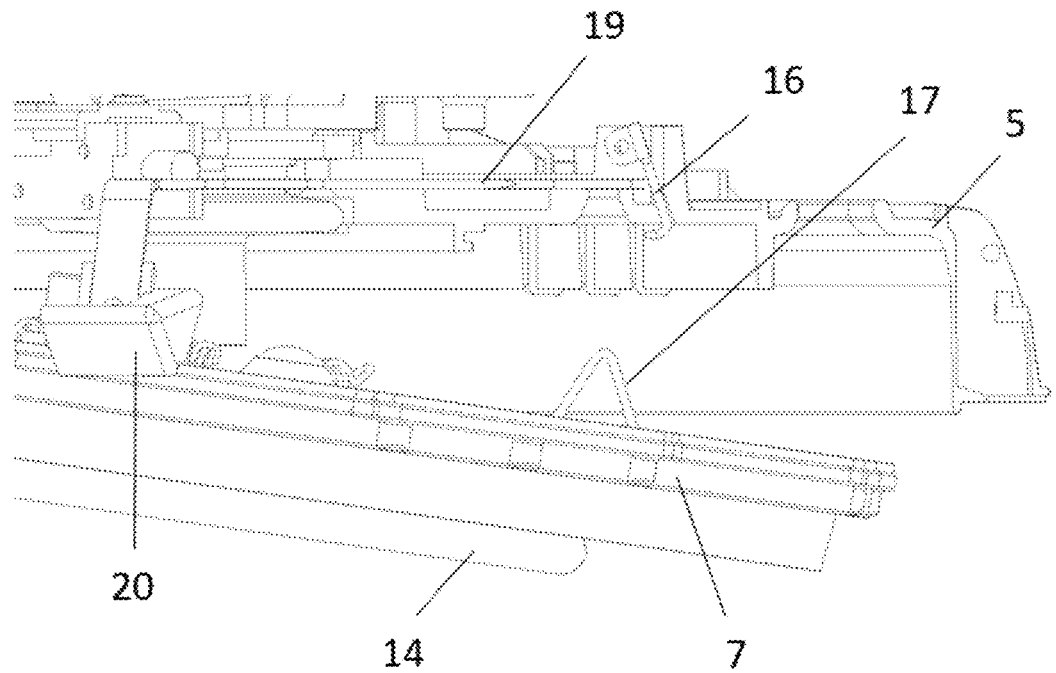

[Fig 13]
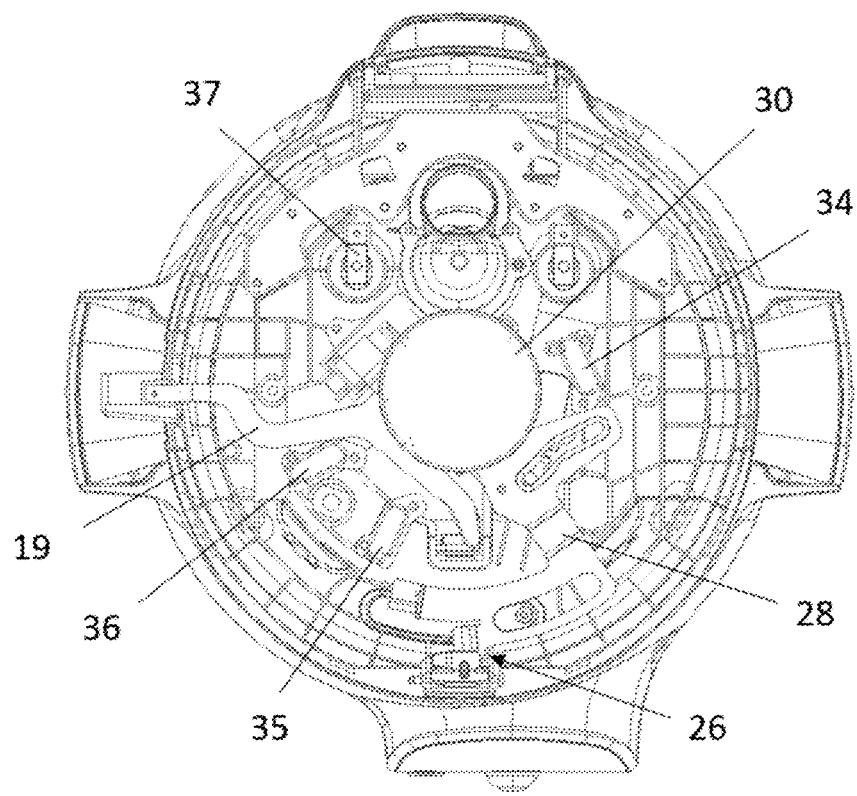
[Fig 14]
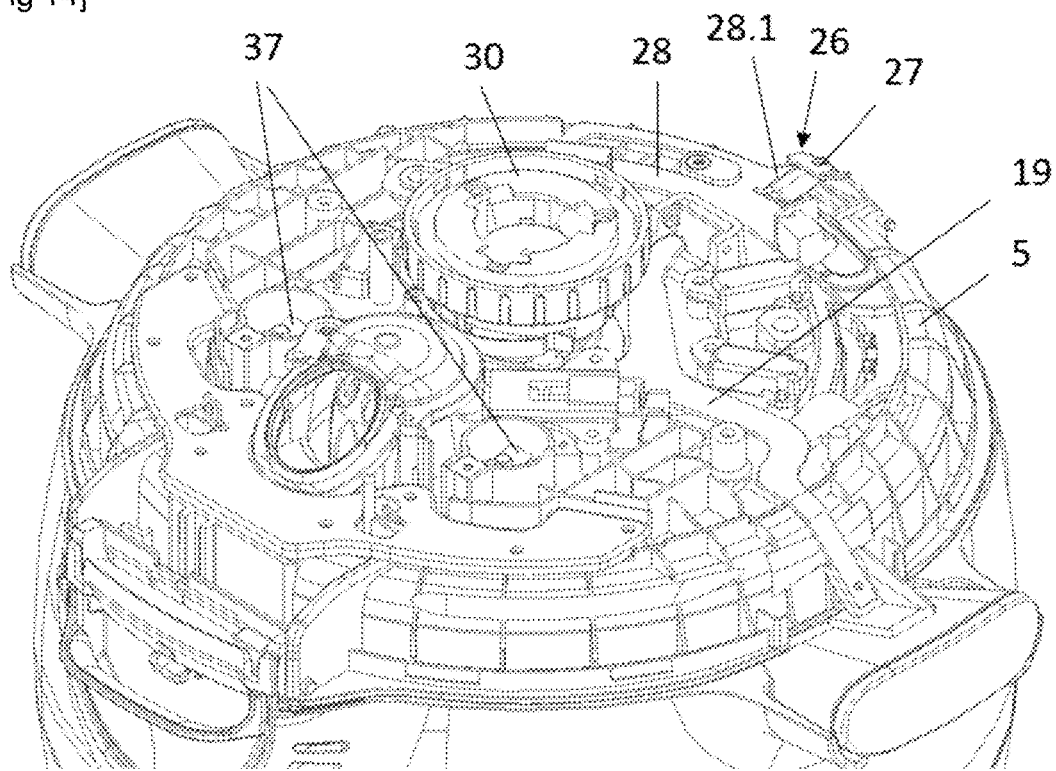

[Fig 15]
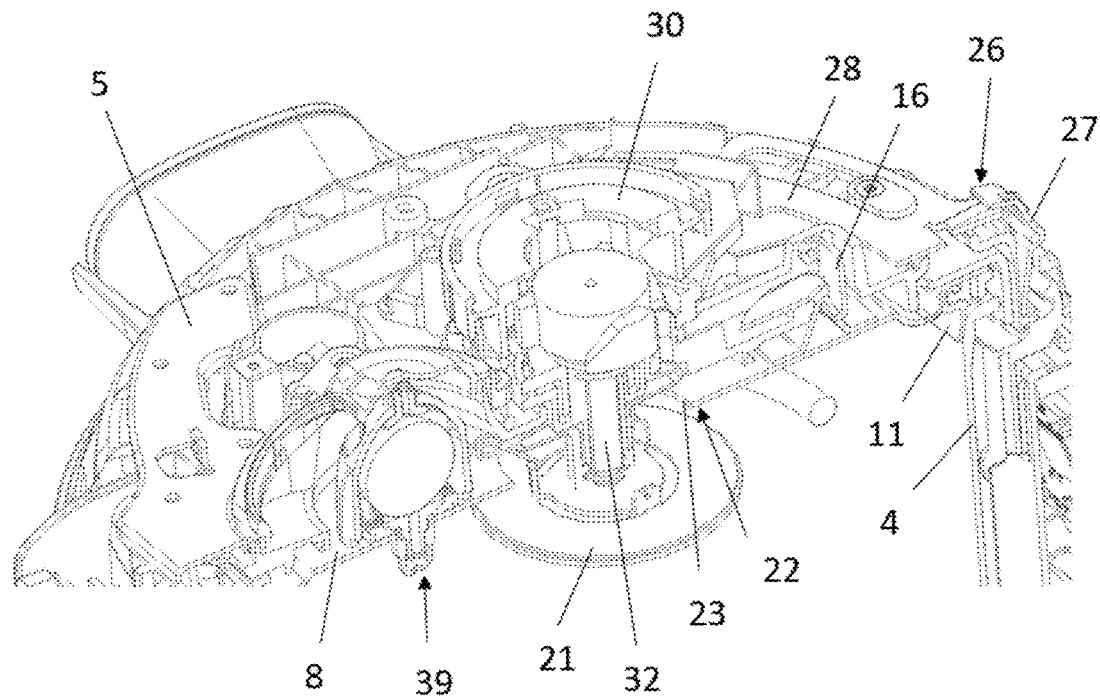
[Fig 16]
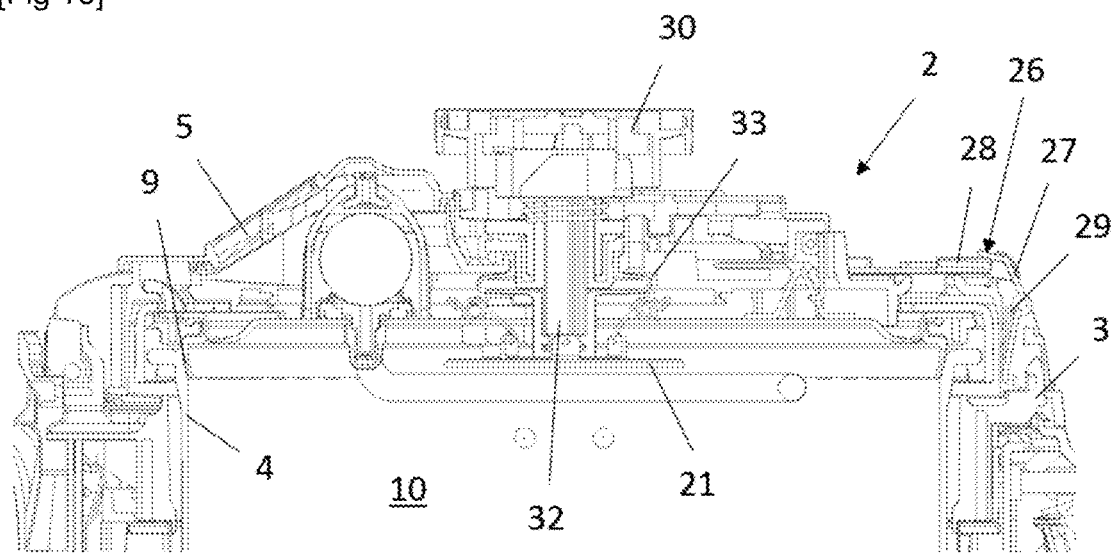

[Fig 17]
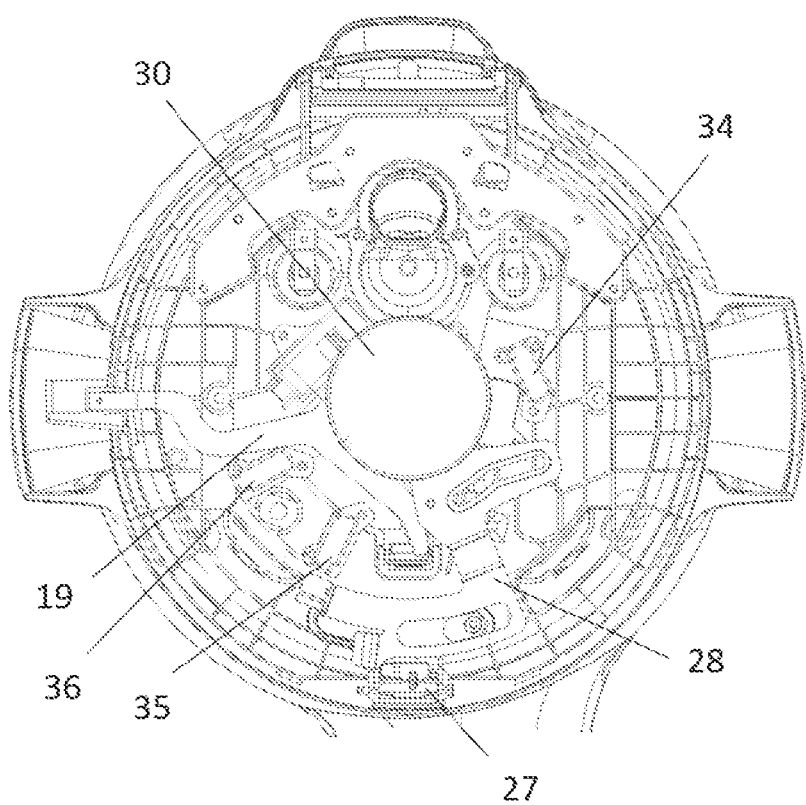

[Fig. 18]
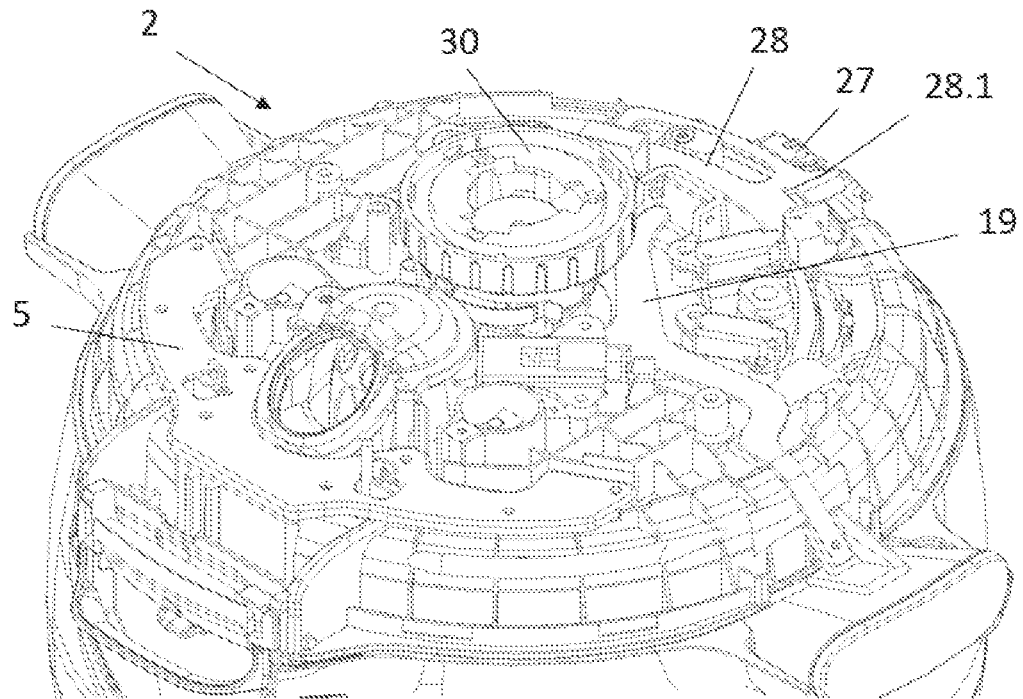
[Fig 19]
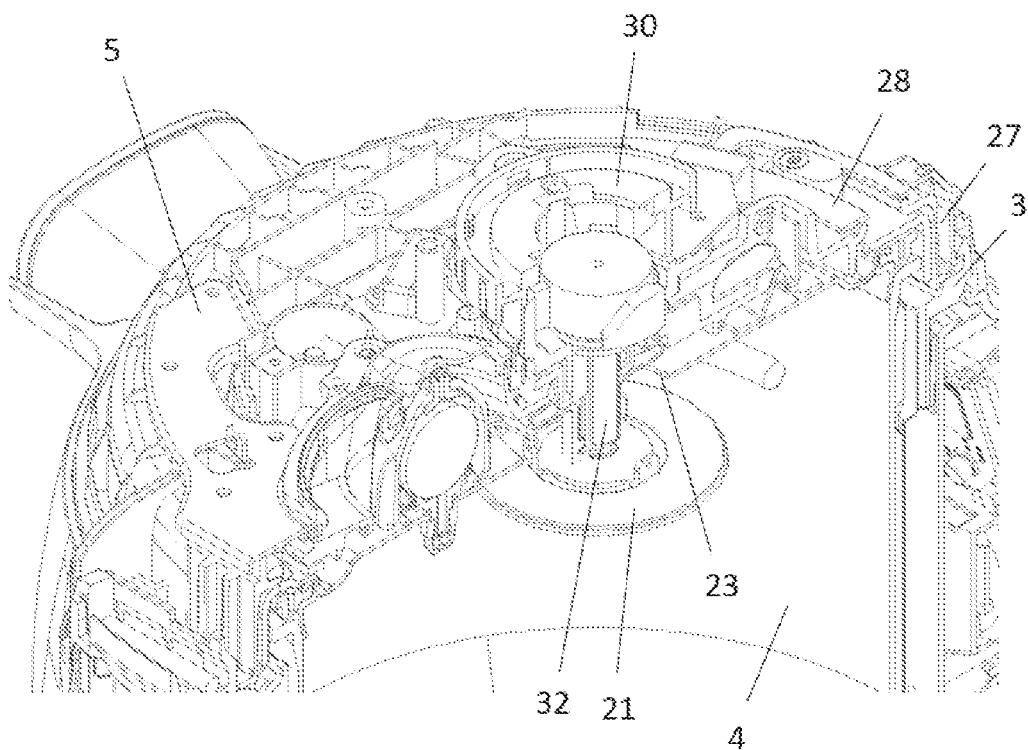

[Fig. 20]
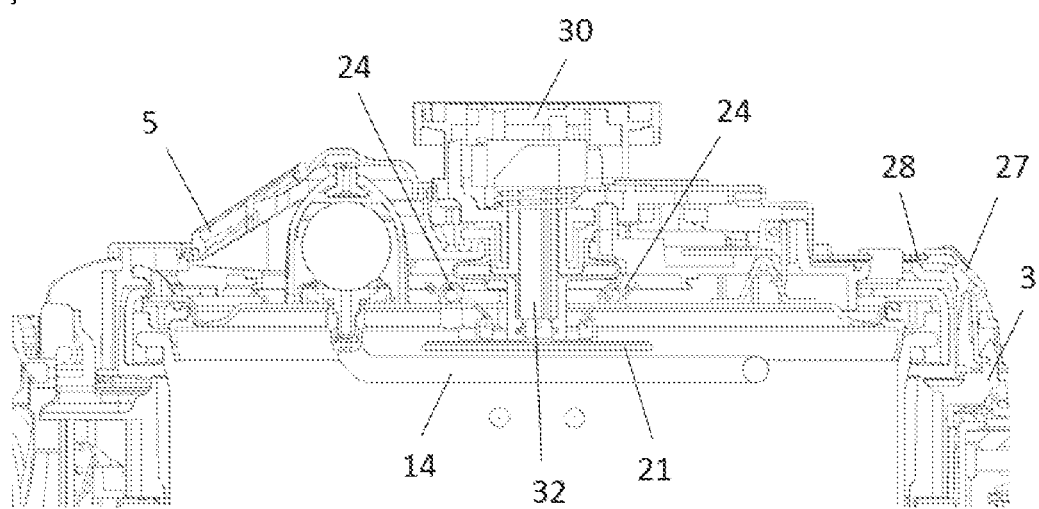

[Fig. 21]
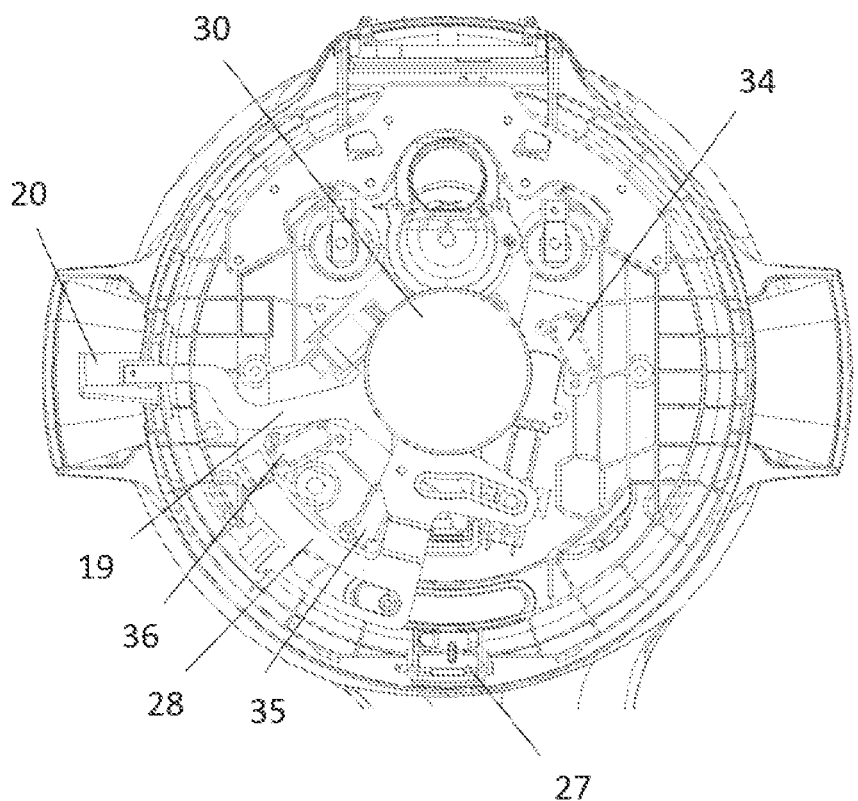
[Fig 22]
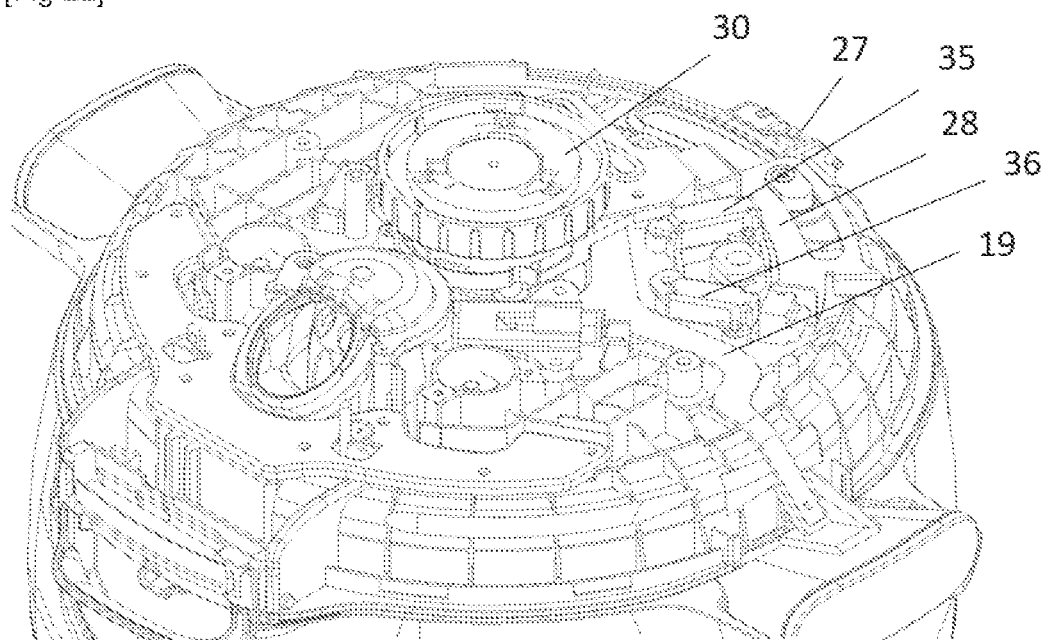

[Fig. 23]
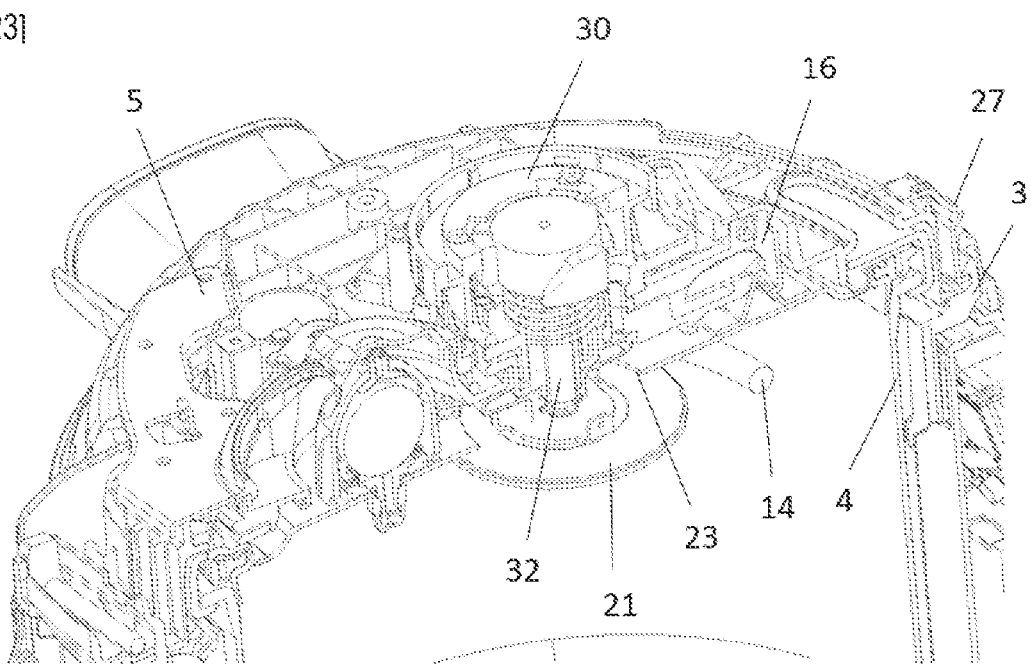
[Fig 24]
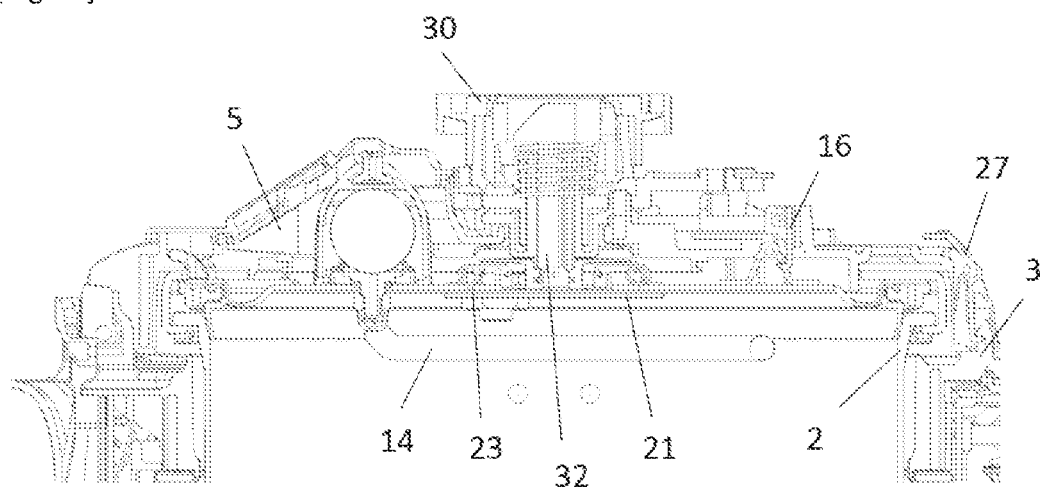

COOKING APPLIANCE FOR COOKING FOOD WITH OR WITHOUT PRESSURE

TECHNICAL FIELD

The present invention generally involves a cooking appliance for cooking food with or without pressure, such as a pressure cooker or an electric pressure cooker.

STATE OF THE ART

In a known way, a cooking appliance comprises:
- a housing having a cooking vessel configured to receive food to be cooked,
- a lid mounted rotatably on the housing between an open position in which the lid frees access to the cooking vessel and a closed position in which the lid prevents access to the cooking vessel,
- a steam outlet valve that is movable between a first valve position in which the steam outlet valve places the inside of the cooking vessel in communication with the outside of the cooking appliance so as to allow steam to exit outwards from the cooking appliance, and a second valve position in which the steam outlet valve fluidly insulates the inside of the cooking vessel from the outside of the cooking appliance to allow pressure to rise in the cooking vessel,
- a lid locking mechanism configured to lock the lid in the closed position, and
- a control member movably mounted on the lid and configured to be handled by a user and to control the locking and unlocking of the lid in relation to the housing.

Depending on the setting of the steam outlet valve's position, such a cooking appliance allows the food received in the cooking vessel to be cooked with or without pressure.

However, the use of such a cooking appliance can be complicated for some users because it is necessary, before starting a cooking program, on the one hand to actuate the control member to lock the lid in a closed position, and on the other hand to position the steam outlet valve in one of the first and second valve positions depending on the type of cooking chosen (with or without pressure).

SUMMARY OF THE INVENTION

The present invention is intended to remedy all or part of these disadvantages.

The technical problem behind the invention, among other things, consists of providing a cooking appliance that is simple in structure, while allowing an easy selection of the type of cooking between pressure cooking and pressure-free cooking.

To this end, the present invention concerns a cooking appliance comprising:
- a housing having a general cooking vessel configured to receive food to be cooked,
- a lid mounted rotatably on the housing between an open position in which the lid frees access to the cooking vessel and a closed position in which the lid prevents access to the cooking vessel,
- a steam outlet opening,
- a steam outlet valve that is movable between a first valve position in which the steam outlet valve frees the steam outlet opening and places the inside of the cooking vessel in communication with the outside of the cooking appliance to allow steam to exit from the cooking appliance, and a second valve position in which the steam outlet valve blocks the steam outlet opening (and thus fluidly insulates the inside of the cooking vessel from the outside of the cooking appliance) so that pressure rises in the cooking vessel,
- a lid locking mechanism configured to lock the lid in the closed position, and
- a control member movably mounted on the lid and configured to be handled by a user and to control a locking and unlocking of the lid in relation to the housing, characterized in that the control member is configured to occupy:
- a first control position in which the lid is unlocked in relation to the housing and the lid can be moved into the open position,
- a second control position in which the lid is locked in the closed position and the steam outlet valve is held in the first valve position, and
- a third control position in which the lid is locked in the closed position and the steam outlet valve is held in the second valve position.

In addition, the lid locking mechanism comprises a rotatable ring with teeth 44 arranged to interact with teeth 45 distributed on the edge of the cooking vessel 4 so that the lid is secured in a closed position on the cooking vessel 4.

Thus, the cooking appliance is configured in such a way that a shifting of the control member from the second control position to the third control position causes the steam outlet valve to move from the first valve position to the second valve position, and in such a way that a shifting of the control member from the third control position to the second control position causes a movement of the steam outlet valve from the second valve position to the first valve position.

Such a configuration of the cooking appliance allows, simply by actuating the control member, to configure the cooking appliance for pressure-free cooking when the control member is in the second control position (because the steam can be evacuated through the steam outlet valve), or for pressure cooking when the control member is in the third control position (because the steam outlet valve then prevents evacuation of the steam to the outside of the cooking appliance).

Moreover, the control member allows the user in one single action to control the locking of the lid and to select the cooking appliance's cooking method according to the present invention, making it much easier to use the cooking appliance according to the present invention.

In addition, the fact that the same member selects the cooking method of the cooking appliance and locks the lid thereof limits the manufacturing costs of the cooking appliance, and increases the reliability thereof.

The cooking appliance can also have one or more of the following characteristics, taken alone or in combination.

According to one embodiment of the invention, the lid locking mechanism comprises a lid locking member provided on the lid and mounted movably between a lid locking position in which the lid locking member cooperates with the housing to lock the lid in the closed position, and a lid release position in which the lid locking member releases the housing and allows the lid to move to the open position.

According to one embodiment of the invention, the lid locking mechanism comprises a drive member configured to move the lid locking member from the lid locking position to the lid release position.

According to one embodiment of the invention, the control member is mechanically connected to the drive member. Advantageously, the drive member is integral in rotation with the control member.

According to one embodiment of the invention, the drive member is configured to immobilize the lid locking member in the lid release position when the control member is in the first control position.

According to one embodiment of the invention, the drive member is configured to occupy a first angular position in which the control member is in the first control position, a second angular position in which the control member is in the second control position, and a third angular position in which the control member is in the third control position, where the first, second and third angular positions are angularly offset from each other.

According to one embodiment of the invention, the lid locking mechanism comprises a return member configured to pull the lid locking member toward the lid locking position.

According to one embodiment of the invention, the control member is designed to be gripped manually to allow the user to manipulate the lid.

According to one embodiment of the invention, the control member is mounted rotatably in relation to the lid.

According to one embodiment of the invention, the cooking appliance comprises at least one biasing element, such as a bias spring, which is configured to pull the steam outlet valve towards the second valve position.

According to one embodiment of the invention, the cooking appliance comprises a valve piston that is configured to move the steam outlet valve into the first valve position when the control member is moved into the second control position.

Advantageously, the valve piston is mechanically connected to the control member.

According to one embodiment of the invention, the valve piston is also configured to move the steam outlet valve into the first valve position when the control member is moved into the first control position.

According to one embodiment of the invention, the valve piston is mounted on the lid.

According to one embodiment of the invention, the cooking appliance comprises a heating device that is removably mounted on an inner surface of the lid, where the heating device comprises a heating member configured to be located facing the food to be cooked received in the cooking vessel and to heat said food to be cooked when the lid is in the closed position.

Such an arrangement of the heating device allows the food received in the cooking vessel to be cooked by grilling, and therefore to be able to cook these foods quickly and for example without adding fat or with very little added fat. Grilling also allows food to be "browned," which is not possible with electric pressure cooker type cooking appliances.

In addition, the fact that the heating device is removable makes it easy to clean, including washing it in the dishwasher.

Moreover, if the cooking appliance according to the present invention is also equipped with a heating element arranged in the housing, then it is possible, at the user's choice, to heat the food received in the cooking vessel according to conduction cooking (i.e. via heating of the side wall of the cooking vessel) and/or by grilling.

According to one embodiment of the invention, the heating member is capable of being activated when the control member is in the second control position. These arrangements allow the food received in the cooking vessel to be cooked in a grill without pressure when the control member is in the second control position.

According to one embodiment of the invention, the heating device comprises a closure element configured to close at least partially an access opening of the cooking vessel when the lid is in the closed position, where the heating member is attached to the closing element.

According to one embodiment of the invention, the at least one biasing element is provided on the closing element.

According to one embodiment of the invention, the steam outlet valve is mounted on the closing element. Advantageously, the steam outlet opening is provided on the closing element.

According to one embodiment of the invention, the closing element and the cooking vessel define a cooking enclosure when the lid is in the closed position, where the heating member is configured to be placed within the cooking enclosure.

According to one embodiment of the invention, the closing element is configured to seal the access opening of the cooking vessel when the lid is in the closed position.

According to one embodiment of the invention, the heating device comprises an annular sealing element that is attached to the closing element and is configured to cooperate sealably with the access opening of the cooking vessel.

According to one embodiment of the invention, the heating member is a resistive heating element.

According to one embodiment of the invention, the cooking appliance comprises a locking mechanism configured to lock the heating device onto the lid, and in particular to lock the closing element onto the lid.

According to one embodiment of the invention, the cooking appliance comprises a retaining receptacle that is provided on the lid, and the heating device comprises a retaining member, such as a retaining finger, which is configured to be received in the retaining receptacle when the heating device is mounted on the lid. Such a configuration of the cooking appliance ensures in particular an easy pre-positioning of the heating device in relation to the lid before the heating device is locked onto the lid.

According to one embodiment of the invention, the heating device is mounted movable in relation to the lid between a locked position in which the heating device is locked onto the lid by the locking mechanism, and a gripping position in which the heating device is released by the locking mechanism and is removable.

According to one embodiment of the invention, the heating device comprises mechanical indexing means configured to define the first, second and third control positions of the control member in relation to the lid. Said provisions ensure that a user has properly reached the selected position.

Mechanical indexing methods may, for example, comprise:
 three notches that are provided on an outer surface of the control member and which are offset angularly from each other, where the three notches are associated respectively with the first, second and third control positions, and
 an elastically deformable tab attached to the lid and configured to be received in one of the three notches depending on the position occupied by the control member.

According to one embodiment of the invention, the cooking appliance has a heating element that is placed in the housing and is configured to heat the cooking vessel, for example by conduction.

According to one embodiment of the invention, the heating element is capable of being activated when the control member is in the third control position. These provisions allow the food received in the cooking vessel to be cooked according to pressure cooking when the control member is in the third control position.

According to one embodiment of the invention, the cooking appliance is an electric cooking appliance.

According to one embodiment of the invention, the cooking appliance is an electric pressure cooker, such as an electric pressure cooker or an electric multicooker with pressure.

According to one embodiment of the invention, the cooking appliance comprises first electrical contacts provided on the lid and second electrical contacts provided on the closing element, where the first electrical contacts are configured to cooperate with the second electrical contacts when the heating device is mounted on the lid, and for example locked onto the lid, in order to electrically supply the heating member.

According to one embodiment of the invention, the cooking appliance comprises a pressure control valve that is configured to regulate the pressure inside the cooking vessel, and especially in the cooking enclosure. For example, the pressure control valve can be a ball valve. Advantageously, the pressure control valve is mounted on the closing element.

According to one embodiment of the invention, the cooking appliance comprises a safety valve that is configured to place the inside of the cooking vessel, and in particular the cooking enclosure, in communication with the outside of the cooking appliance when the pressure inside the cooking vessel exceeds a predetermined threshold value. Advantageously, the safety valve is mounted on the closing element.

According to one embodiment of the invention, the cooking appliance comprises a temperature sensor configured to determine the temperature of the heating device, and for example of the closing element.

According to one embodiment of the invention, the cooking appliance comprises a plurality of position sensors configured to detect the position occupied by the control member.

According to one embodiment of the invention, the cooking appliance comprises a control unit configured to control the power supply of the heating member when the control member is in the second control position, and for example when the plurality of position sensors has detected the fact that when the control member is in the second control position.

According to one embodiment of the invention, the control unit is configured to control the power supply of the heating element when the control member is in the third control position, and for example when the plurality of position sensors has detected the fact that the control member is in the third control position.

According to one embodiment of the invention, the control unit is also configured to control the heating member's power supply when the control member is in the third control position, for example during an initial phase of a cooking mode of the cooking appliance in order to reduce the time necessary to bring the cooking vessel up to pressure.

According to one embodiment of the invention, the cooking appliance comprises a first position sensor configured to detect that the control member is in the first control position, a second position sensor configured to detect that the control member is in the second control position, and a third position sensor configured to detect that the control member is in the third control position.

According to one embodiment of the invention, the first position sensor is configured to be activated by the drive member when the drive member is in the first angular position, the second position sensor is configured to be activated by the drive member when the drive member is in the second angular position, and the third position sensor is configured to be activated by the drive member when the drive member is in the third angular position.

BRIEF DESCRIPTION OF THE FIGURES

The invention will be understood better with the help of the description below with reference to the attached schematic drawings showing, by way of nonlimiting example, an embodiment of this electric cooking appliance.

FIG. 1 is a perspective view of an electric cooking appliance according to the present invention showing a lid of the appliance in a closed position.

FIG. 2 is a partial perspective view of the electric cooking appliance in FIG. 1 showing the lid in an open position.

FIG. 3 is a partial perspective view of the electric cooking appliance in FIG. 1 showing a heating device in the gripping position.

FIG. 4 is a side view of the electric cooking appliance in FIG. 1 showing the heating device in the gripping position.

FIG. 5 is a partial top view of the electric cooking appliance in FIG. 1 showing an actuating member in the unlocking position.

FIG. 6 is a cross-section view of the lid and heating device in the gripping position.

FIG. 7 is a perspective top view of the heating device.

FIG. 8 is a perspective view from below of the heating device.

FIG. 9 is a partial perspective view of the electric cooking appliance in FIG. 1 showing the lid in an open position and in which the heating device has been placed.

FIG. 10 is a partial, partially truncated side view of the electric cooking appliance in FIG. 1 showing the heating device in a locked position.

FIG. 11 is a partial, partially truncated perspective view of the electric cooking appliance in FIG. 1 showing the heating device in a locked position.

FIG. 12 is a partial, partially truncated side view of the electric cooking appliance in FIG. 1 showing the heating device in the gripping position.

FIG. 13 is a partial top view of the electric cooking appliance in FIG. 1 showing a control member in a First control position.

FIG. 14 is a partial perspective view of the electric cooking appliance in FIG. 1 showing the control member in the First control position.

FIG. 15 is a partial, partially truncated perspective view of the electric cooking appliance in FIG. 1 showing the control member in the First control position.

FIG. 16 is a partial, partially truncated side view of the electric cooking appliance in FIG. 1 showing the control member in the First control position.

FIG. 17 is a partial top view of the electric cooking appliance in FIG. 1 showing the control member in a second control position.

FIG. 18 is a partial perspective view of the electric cooking appliance in FIG. 1 showing the control member in the second control position.

FIG. 19 is a partial, partially truncated perspective view of the electric cooking appliance in FIG. 1 showing the control member in the second control position.

FIG. 20 is a partial, partially truncated side view of the electric cooking appliance in FIG. 1 showing the control member in the second control position.

FIG. 21 is a partial top view of the electric cooking appliance in FIG. 1 showing the control member in a third control position.

FIG. 22 is a partial perspective view of the electric cooking appliance in FIG. 1 showing the control member in the third control position.

FIG. 23 is a partial, partially truncated perspective view of the electric cooking appliance in FIG. 1 showing the control member in the third control position.

FIG. 24 is a partial, partially truncated side view of the electric cooking appliance in FIG. 1 showing the control member in the third control position.

DETAILED DESCRIPTION

FIGS. 1 to 24 represent an electric cooking appliance 2, and more specifically an electric pressure cooker, such as an electric pressure cooker or an electric pressure multi-cooker.

As shown in particular in FIGS. 1 and 2, the electric cooking appliance 2 comprises a housing 3 with a cooking vessel 4 configured to receive food to be cooked, and a lid 5 mounted pivotably on the housing 3 between an open position (see FIG. 1) in which the lid 5 frees access to the cooking vessel 4, and a closed position (see FIG. 2) in which the lid 5 prevents access to the cooking vessel 4. According to the embodiment depicted in the figures, the cooking vessel 4 has a substantially circular cross section. However, the cooking vessel 4 could have a cross section of a completely different shape, for example square or rectangular.

The electric cooking appliance 2 further comprises a heating element 6 that is disposed in the housing 3 and is configured to heat the cooking vessel 4 by conduction. For example, the heating element 6 can be a resistive heating element that extends around at least a portion of a side wall of the cooking vessel 4.

The electric cooking appliance 2 also comprises a heating device 7 that is removably mounted on an inner surface of the lid 5.

The heating device 7 comprises a closure element, 8 for example metal, configured to seal an access opening 9 of the cooking vessel 4 when the lid 5 is in the closed position. The closing element 8 and the cooking vessel 4 thus define a cooking enclosure 10 when the lid 5 is in the closed position.

In order to ensure a seal between the closing element 8 and the cooking vessel 4, the heating device 7 advantageously has an annular sealing element 11 (see FIGS. 6 and 15) that is attached to the closing element 8 and which is configured to cooperate sealably with the access opening 9 of the cooking vessel 4.

The closing element 8 comprises a first surface 8.1 configured to be oriented towards the lid 5, and a second surface 8.2 configured to be oriented towards the cooking vessel 4 when the lid 5 is in the closed position. According to the embodiment depicted in the figures, the closing element 8 has an overall circular shape.

The electric cooking appliance 2 further comprises a retaining receptacle 12 (see FIG. 9) which is provided on the lid 5, and the heating device 7 comprises a retaining member 13 (see FIGS. 6 and 7), such as a retaining finger, which is integral with the closing element 8 and is configured to be received into the retaining receptacle 12 when the closing element 8 is mounted on the lid 5.

The heating device 7 also comprises a heating member 14 that is attached to the closing element 8 and extends over the second surface 8.2 of the closing element 8. The heating member 14 can, for example, be a resistive heating element, and extend substantially in a circular arc. Advantageously, the angle in the center of the arc defined by the heating member 14 is greater than 180°, and for example more than 220°.

The heating member 14 is configured to be arranged in the cooking enclosure 10 and to be located facing the food to be cooked received in the cooking vessel 4 when the lid 5 is in the closed position. Thus, the heating member 14 is more specifically configured to heat by radiation and convection the food to be cooked received in the cooking vessel 4 when the lid 5 is in the closed position.

The electric cooking appliance 2 also comprises a locking mechanism 15 configured to lock the heating device 7 onto the lid 5, and more specifically to lock the closure element 8 onto the lid 5.

As shown in particular in FIGS. 11 and 12, the locking mechanism 15 comprises a locking element 16, such as a locking finger, mounted pivotably on the lid 5 around a pivot axis and between a locking position (see FIG. 11) in which the locking element 16 cooperates with a locking member 17 provided on the first surface 8.1 of the closing element 8 in such a way as to lock the closing element 8 onto the lid 5, and a release position (see FIG. 12) in which the locking element 16 releases the locking member 17 and thus the closing element 8, therefore allowing dismantling of the heating device 7. According to the embodiment shown in the figures, the locking member 17 comprises a locking aperture 18 and the locking element 16 is configured to be inserted at least partially into the locking aperture 18 when the locking element 16 is moved into the locked position. Advantageously, the locking element 16 is located opposite the retaining receptacle 12, and is, for example, diametrically opposite to the retaining receptacle 12.

The electric cooking appliance 2 advantageously comprises a biasing member (not shown in the figures), such as a spring, mounted on the lid 5 and configured to pull the locking element 16 towards the locking position.

As shown in FIG. 5, the electric cooking appliance 2 further comprises an actuating member 19, such as an actuating lever, configured to move the locking element 16 from the locking position to the release position.

The actuating member 19 is mounted pivotably on the lid 5 around an axis of movement and between a resting position (see FIGS. 11 and 13) in which the locking element 16 is in the locking position and an unlocking position (see FIGS. 5 and 12) in which the locking element 16 is in the release position, where the actuating member 19 is configured so that a shifting of the actuating member 19 from the resting position to the unlocking position causes the locking element 16 to move from the locking position to the release position. For example, the axis of movement of the actuating member 19 can be orthogonal to the pivot axis of the locking element 16. Advantageously, the actuating member 19 is configured to maintain the locking element 16 in the release position when the actuating member 19 is in the unlock position.

According to the embodiment shown in the figures, the actuating member 19 comprises an actuating arm 19.1 configured to cooperate with the locking element 16, and a gripping arm 19.2 comprising a gripping part 20, such as a gripping handle, which can be manipulated by a user to move the actuating member 19 between the rest position and the unlock position. Advantageously, the gripping part 20 is accessible to a user only when the lid 5 is in the open position.

As shown in particular in FIGS. 2 and 3, the heating device 7 is mounted movably in relation to the lid 5 between a locked position in which the heating device 7 is locked onto the lid 5 by the locking mechanism 15, and a gripping position in which the heating device 7 is released by the locking mechanism 15 and is removable. Advantageously, moving the heating device 7 between the locked position and the gripping position causes the heating device 7 to tilt around a tilt axis that is substantially parallel to the pivot axis of the locking element 16 and extends close to the retaining member 13. The heating device 7 is advantageously maintained in the gripping position in a stable manner partly because of the cooperation of the retaining member 13 with the retaining receptacle 12.

The electric cooking appliance 2 further comprises a steam outlet valve 21 that is mounted on the closing element 8 and is movable between a first valve position (see FIGS. 15 and 16) in which the steam outlet valve 21 is separated from a valve seat 22 extending around a steam outlet opening 23 provided on the closing element 8 and places the inside of the cooking vessel 4 in communication with the outside of the electric cooking appliance 2 so as to allow steam to exit from the electric cooking appliance 2, and a second valve position (see FIGS. 23 and 24) in which the steam outlet valve 21 sealably engages with the valve seat 22 and fluidly insulates the inside of the cooking vessel 4 from the outside of the electric cooking appliance 2 to allow for an increase in pressure in the cooking vessel 4.

Advantageously, the electric cooking appliance 2 has a plurality of biasing elements 24 (see especially FIG. 7), such as biasing springs, which are configured to pull the steam outlet valve 21 towards the second valve position. Advantageously, the biasing elements 24 are provided on the closing element 8 and are distributed regularly around the steam outlet opening 23.

As shown in FIG. 9, the electric cooking appliance 2 also comprises a gasket 25 that is mounted on the lid 5 and is configured to be interposed between the lid 5 and the closing element 8. The gasket 25 is configured to extend around the steam outlet valve 21 and to pull the heating device 7 towards the gripping position.

The electric cooking appliance 2 further comprises a lid locking mechanism 26 configured to lock the lid 5 in the closed position.

The lid locking mechanism 26 comprises a lid locking member 27 provided on the lid 5 and mounted movably between a lid locking position (see FIGS. 19 and 20) in which the lid locking member 27 cooperates with the housing 3 to lock the lid 5 in the closed position, and a lid release position (see FIGS. 15 and 16) in which the lid locking member 27 releases the housing 3 and allows the lid 5 to be moved to the open position.

As shown in particular in FIGS. 13, 14 and 16, the lid locking mechanism 26 further comprises a drive member 28 configured to move the lid locking member 27 from the lid locking position to the lid release position, and a return member 29 configured to pull the lid locking member 27 towards the lid locking position. As shown in FIG. 2, the lid locking mechanism 26 also comprises a rotatable ring 43 comprising teeth 44 arranged to interact with teeth 45 distributed on the edge of the cooking vessel 4 so as to lock the lid in a closed position onto the cooking vessel 4. Thus, concurrent to the movement of the lid locking member 27 by the drive member 28, the drive member 28 also rotates the rotatable ring 43 between a lid locking position 5 on the cooking vessel 4 in which the teeth 44 of the rotatable ring 43 engage with the teeth 45 distributed on the edge of the cooking vessel 4 and a lid release position 5 in which the teeth 44 of the rotatable ring 43 are offset relative to the teeth 45 distributed on the edge of the cooking vessel 4. The operation of the drive member 28 is described in more detail below.

The electric cooking appliance 2 also comprises a control member 30 that is mechanically connected to the drive member 28 and is configured to be handled by a user and to control the locking and unlocking of the lid 5 in relation to housing 3, but also in relation to the cooking vessel 4.

The control member 30 is mounted movable in rotation on the lid 5 and is configured to occupy:
a first control position (see FIGS. 13 to 16) in which the lid 5 is unlocked in relation to housing 3 and the lid 5 can be moved to the open position,
a second control position (see FIGS. 17 to 20), also called grill position, in which the lid 5 is locked in the closed position, the steam outlet valve 21 is maintained in the first valve position and the heating member is capable of being activated, and
a third control position (see FIGS. 21 to 24), also known as pressure position, in which the lid 5 is locked in the closed position, the steam outlet valve 21 is maintained in the second valve position and the heating element 6 is capable of being activated.

Thus, the electric cooking appliance 2 is configured in such a way that moving the control member 30 from the second control position to the third control position causes the steam outlet valve 21 to move from the first valve position to the second valve position, and in such a way that moving the control member 30 from the third control position to the second control position results in moving the control member 30 from the third control position to the second control position causes movement of the steam outlet valve 21 from the second valve position to the first valve position.

According to the embodiment shown in the figures, the drive member 28 is integral in rotation with the control member 30 and is configured to occupy a first angular position (see FIG. 13) in which the control member 30 is in the first control position and the drive member 28 immobilizes the lid locking member 27 in the lid release position, a second angular position (see especially FIG. 17) in which the control 30 is in the second control position and the drive 28 does not cooperate with the lid locking member 27, and a third angular position (see in particular FIG. 21) in which the control member 30 is in the third control position and the drive member 28 is removed from the cover locking member 27, the first, second and third angular positions being angularly offset from each other.

Advantageously, the drive member 28 has a sloping ramp 28.1 (see in particular FIG. 14) configured to lift a rear part of the lid locking member 27 and rotate it into the lid release position when the drive 28 is moved from the second angular position to the first angular position.

The electric cooking appliance 2 also has a valve piston 32 that is mounted on the lid 5 and is mechanically connected to the control member 30, for example by a set of fingers and cams with variable slopes provided respectively on the control member 30 and the valve piston 32.

The valve piston 32 extends substantially parallel to the rotational axis of the control member 30 and is mounted movable relative to the lid 5 between a first piston position (see FIG. 16) corresponding to the first valve position, and a second piston position (see FIG. 24) corresponding to the second valve position. The valve piston 32 is advantageously configured to occupy the first piston position when the control member 30 is in the first and second control positions, and to occupy the second piston position when the control member 30 is in the third control position.

The valve piston 32 is specifically configured to move the steam outlet valve 21 into the first valve position (against the biasing force exerted by the biasing elements 24 on the steam outlet valve 21) when the control member 30 is moved into the first control position and into the second control position, and to allow the steam outlet valve 21 to move (due to the biasing force exerted by the biasing elements 24 on the steam outlet valve 21) into the second valve position when control member 30 is moved into the third control position.

Advantageously, the valve piston 32 can be at least partially covered by protective valve boot 33 so that the valve boot 33 is interposed between the valve piston 32 and the steam outlet valve 21, and in order to protect the valve piston 32 and the control member 30 from moisture.

The electric cooking appliance 2 also comprises a plurality of position sensors configured to detect the position occupied by the control member 30. For example, the electric cooking appliance 2 may have a first position sensor 34 configured to detect that control member 30 is in the first control position, a second position sensor 35 configured to detect that the control member 30 is in the second control position, and a third position sensor 36 configured to detect that the control member 30 is in the third position.

According to one embodiment of the invention, the first position sensor 34 is configured to be activated by the drive member 28 when the drive member 28 is moved into the first angular position, the second position sensor 35 is configured to be activated by the drive member 28 when the drive member 28 is moved into the second angular position, and the third position sensor 36 is configured to be activated by the drive member 28 when the drive member 28 is moved into the third angular position.

The electric cooking appliance 2 further comprises first electrical contacts 37 (see FIG. 5) on the lid 5 and second electrical contacts 38 (see FIG. 7) provided on the closing element 8. The first electrical contacts 37 are configured to cooperate with the second electrical contacts 38 when the closing element 8 is locked onto the lid 5, in order to ensure power supply to the heating member 14.

According to the embodiment shown in the figures, the first and second electrical contacts 37, 38 are protected from the steam generated in the cooking vessel 4 by the gasket 25.

Advantageously, the electric cooking appliance 2 comprises a pressure control valve 39 (see FIGS. 7 and 8) that is mounted on the closing element 8 and is configured to regulate the pressure inside the cooking vessel 4, and especially in the cooking chamber 10. For example, the pressure control valve 39 can be a ball valve.

The electric cooking appliance 2 may further comprise a safety valve 40 (see FIGS. 7 and 8) that is mounted on the closing element 8 and is configured to place the inside of the cooking vessel 4, and in particular the cooking enclosure 10, in communication with the outside of the electric cooking appliance 2 when the pressure inside the cooking vessel 4 exceeds a predetermined threshold value.

The electric cooking appliance 2 may also have a temperature sensor 41 (see FIG. 9) configured to determine the temperature of the heating device 7, and for example the closing element 8.

The electric cooking appliance 2 further comprises a control unit 42 configured to control the power supply of the heating element 6 and the heating member 14 depending in particular on the position occupied by the control member 30.

The control unit 42 is more specifically configured to control the power to the heating member 14 when the control member 30 is in the second control position, and therefore when the second position sensor 35 has detected the fact that the control member 30 is in the second control position. However, the control unit 42 could also be configured to control the power to the heating member 14 when the control member 30 is in the third control position, for example during an initial phase of a pressure cooking mode of the electrical cooking appliance 2, in order to reduce the time required to bring the cooking vessel 4 up to pressure.

For example, the control unit 42 can be configured to control the power to the heating element 6 only when the control member 30 is in the third control position, and therefore when the third position sensor 36 has detected the fact that the control member 30 is in the third control position.

The control unit 42 can also comprise, in a known way, buttons and/or screen allowing a user to select a cooking mode. For example, the user can select a cooking time and temperature or choose from pre-recorded cooking programs.

In addition, the control unit 42 is configured to activate or deactivate the heating element 6 and the heating member 14 based on a cooking program chosen by the user, as well as on the temperature measurements of the temperature sensor 41 and a possible additional temperature sensor associated with the heating element 6.

Thus, the electric cooking appliance 2 according to the present invention makes it possible, simply by actuating the control member 30, to configure the electric cooking appliance 2 for pressure-free grilling when the control member 30 is in the second control position (because the steam can be evacuated through the steam outlet valve 21), or for pressurized cooking when the control member 30 is in the third control position (because of the fact that steam outlet valve 21 then prevents steam from being evacuated to the exterior of the electrical appliance).

In addition, the fact that the heating device 7 is removable makes it much easier to clean the electric cooking appliance 2 according to the present invention.

When understood correctly, the present invention is in no way limited to the embodiment described and illustrated, since this embodiment was only provided by way of example. It is still possible to make modifications, specifically in terms of the way in which the various elements are composed or in terms of substituting equivalent techniques, provided that they remain within the scope of the invention.

The invention claimed is:

1. A cooking appliance comprising:
   a housing comprising a cooking vessel configured to receive food to be cooked,
   a lid mounted pivotably on the housing between an open position in which the lid is configured to free access to the cooking vessel and a closed position in which the lid is configured to prevent access to the cooking vessel,
   a steam outlet opening, a steam outlet valve that is movable between a first valve position in which the steam outlet valve is configured to release the steam outlet opening and to place the interior of the cooking vessel in communication with the exterior of the cooking appliance so as to enable the exit of steam to the exterior of the cooking appliance, and a second valve position in which the steam outlet valve is configured to close the steam outlet opening so as to enable an increase in pressure inside the cooking vessel, a lid locking mechanism configured to lock the lid in the closed position, the lid locking mechanism comprising a rotatable ring comprising a first plurality of teeth configured to interact with a second plurality of teeth arranged on an edge of the cooking vessel, wherein the lid locking mechanism comprises a locking element and a lid locking member provided on the lid and movably mounted between a lid locking position in which the lid locking member is configured to cooperate with the housing in order to lock the lid in the closed position, and a lid release position in which the lid locking member is configured to release the housing and to allow the lid to move into the open position, the lid locking member comprising a locking aperture, wherein the locking element is configured to be inserted at least partially into the locking aperture when the locking element is moved into a locked position, and wherein the locking element is configured to move out of the locking aperture and release the locking member when the locking element is moved into an unlocked position, and a control member movably mounted on the lid and configured to be handled by a user and to control the locking and unlocking of the lid relative to the housing, wherein the control member is configured to occupy:
- a first control position in which the lid is unlocked in relation to the housing and the lid can is configured to be moved into the open position,
- a second control position in which the lid is locked in the closed position and the steam outlet valve is maintained in the first valve position, and
- a third control position in which the lid is locked in the closed position and the steam outlet valve is maintained in the second valve position.

2. The cooking appliance according to claim 1, wherein the lid locking mechanism comprises a drive member configured to move the lid locking member from the lid locking position to the lid release position.

3. The cooking appliance according to claim 2, wherein the drive member is integral in rotation with the control member.

4. The cooking appliance according to claim 2, wherein the drive member is configured to immobilize the lid locking member in the lid release position when the control member is in the first control position.

5. The cooking appliance according to claim 1, wherein the control member is configured to be gripped manually in order to allow the user to handle the lid.

6. The cooking appliance according to claim 1, wherein the control member is rotatably mounted in relation to the lid.

7. The cooking appliance according to claim 1, further comprising at least one biasing element configured to bias the steam outlet valve towards the second valve position.

8. The cooking appliance according to claim 1, further comprising a valve piston configured to move the steam outlet valve into the first valve position when the control member is moved into the second control position.

9. The cooking appliance according to claim 8, wherein the valve piston is mounted on the lid.

10. The cooking appliance according to claim 1, further comprising a heating device mounted on an inner surface of the lid, the heating device comprising a heating member configured to be located facing the food to be cooked received in the cooking vessel and to heat said food to be cooked when the lid is in the closed position.

11. The cooking appliance according to claim 10, wherein the heating device comprises a closing element configured to at least partially close an access opening of the cooking vessel when the lid is in the closed position, the heating member attached to the closing element.

12. The cooking appliance according to claim 11, wherein the closing element and the cooking vessel define a cooking enclosure when the lid is in the closed position, the heating member configured to be placed in the cooking enclosure.

13. The cooking appliance according to claim 11, wherein the closing element is configured to seal the access opening of the cooking vessel when the lid is in the closed position.

14. The cooking appliance according to claim 11, wherein the steam outlet valve is mounted on the closing element.

15. The cooking appliance according to claim 10, further comprising a locking mechanism configured to lock the heating device onto the lid.

16. The cooking appliance according to claim 1, further comprising a heating element arranged in the housing and configured to heat the cooking vessel.

17. The cooking appliance according to claim 1, wherein the cooking appliance is an electric cooking appliance.

* * * * *